United States Patent [19]

Meeker

[11] Patent Number: 5,181,761
[45] Date of Patent: Jan. 26, 1993

[54] CHILD RESTRAINT SYSTEM

[75] Inventor: Paul K. Meeker, Aurora, Ohio

[73] Assignee: Lisco, Inc., Tampa, Fla.

[21] Appl. No.: 762,532

[22] Filed: Sep. 12, 1991

[51] Int. Cl.⁵ .............................................. B60N 2/28
[52] U.S. Cl. .................................... 297/250; 297/328
[58] Field of Search ........ 299/250, 328, 313, 325–327; 108/6, 7; 248/371

[56] References Cited

U.S. PATENT DOCUMENTS

| | | | |
|---|---|---|---|
| 2,143,634 | 1/1939 | Saunders | 297/328 |
| 3,198,575 | 8/1965 | Hawkins | 297/328 |
| 3,572,827 | 3/1971 | Merelis | 297/250 X |
| 4,047,755 | 9/1977 | McDonald et al. | 297/377 X |
| 4,168,050 | 9/1979 | Nerem et al. | 297/328 X |
| 4,632,456 | 12/1986 | Kassai | 297/250 X |

Primary Examiner—Peter R. Brown

[57] ABSTRACT

A restraining system for a child comprising in combination a child seat having a foot end and a head end and side edges therebetween, the seat having downwardly extending projections with aligned apertures; a base having a front end and a back end and side edges therebetween, the base having upwardly extending projections with aligned apertures; a cylindrical pivot shaft located within the apertures of the seat and base to allow the pivoting of the seat with respect to the base; a latch rod pivotally secured to the base with a latch mounted adjacent to each end thereof, each latch having a plurality of recesses adapted to receive pins of the seat to thereby secure the seat in any one of a plurality of angular positions; and springs to hold the recesses in contact with the pins.

6 Claims, 7 Drawing Sheets

CHILD RESTRAINT SYSTEM

BACKGROUND OF THE INVENTION

1. Field of the Invention

This invention relates to a child restraint system and, more particularly, to an improved system which includes a child seat for receiving a child, a base adapted to pivotably receive the child seat, and mechanisms for effecting the selective pivotable positioning of the seat with respect to the base.

2. Description of the Background Art

The safety of children in moving cars is a continuing concern to parents. Such concern is also shared by governments where safety laws are being passed in increasing numbers of jurisdictions. Because of parental concern and government involvement, there has been a large number of technical advances relating to child restraint systems for cars. Such advances are normally directed to increased safety but must be balanced against convenience of use and comfort of the child. If a restraint system is inconvenient to the parent or uncomfortable for the child, there will be a greater tendency to avoid usage regardless of the inherent safety of the system.

Commercially available devices and the background art disclose a wide variety of child restraint systems for use in cars. As a general rule, it seems that the safest devices are the ones which are more uncomfortable to the child user and more complex for the parent to use. Additionally, high cost tends to negate wide usage of restraint systems by reducing the number of initial purchases while uncomfortable or complex mechanisms can also tend to discourage usage. Conversely, more comfortable or convenient restraint systems which are less expensive provide the maximum usage and safety.

A large number of child restraint systems are in commercial use while others are described in the patent literature By way of example note U.S. Pat. Nos. 3,975,050 to 4,561,621 to Hill, and 4,632,456 to Kassai. The McKee patent relates to a mechanism for coupling a tilting swivel chair and its support for adjusting the seating of a vehicle driver and/or passenger for increased comfort. The support can swivel the seat and angularly orient it into one of a plurality of positions. The Hill patent relates to an earth-working vehicle wherein the seat is adjustably spring-biased at its back with an adjustable break mechanism at its front, all for user comfort. The Kassai patent relates to a children's automobile-mounted safety seat. The seat includes a seat portion and a base with the seat rotatably supported on the base.

None of the known commercial devices or prior patents discloses a child car seat coupled with respect to a base with adjustable attachments therebetween, with the adjustment mechanisms on the base out of reach of the supported child. Although many such prior advances are noteworthy to one extent or another, no background patent or known commercial device teaches or suggests the safe, convenient, reliable, and economic child restraint system as disclosed herein.

As illustrated by a great number of prior patent disclosures and commercial devices, efforts are continuously being made in an attempt to more efficiently design, manufacture and utilize child car seats. No prior effort, however, suggests the present inventive combination of component elements arranged and configured as disclosed herein. Prior devices do not provide the benefits attendant with the present invention. The present invention achieves its intended purposes, objects and advantages over the prior art devices through a new, useful and unobvious combination of component elements, through the use of a minimum number of functioning parts, at a reasonable cost to manufacture, and through the utilization of only readily available materials and conventional components.

Therefore, it is an object of the present invention to provide a restraining system for a child comprising in combination a child seat having a foot end and a head end and side edges therebetween, the seat having downwardly extending projections with aligned apertures; a base having a front end and a back end and side edges therebetween, the base having upwardly extending projections with aligned apertures; a cylindrical pivot shaft located within the apertures of the seat and base to allow the pivoting of the seat with respect to the base; a latch rod pivotally secured to the base with a latch mounted adjacent to each end thereof, each latch having a plurality of recesses adapted to receive pins of the seat to thereby secure the seat in any one of a plurality of angular positions; and spring means to hold the recesses in contact with the pins.

It is another object of the invention to improve the safety of children riding in cars.

It is another object of the invention to adjustably couple a child car seat to a base which is, in turn, attachable to a car by a seat belt.

It is another object of the invention to increase the convenience and comfort of a child in a restraint system of a car.

It is another object of the invention to latch a pivotable seat with respect to a base with mechanisms to preclude separation in the event of a crash.

Lastly it is an object of the present invention to promote the usage of child restraint systems in cars by maximizing safety, comfort and convenience.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into a restraining system for a child comprising in combination a child seat having a foot end and a head end and side edges therebetween, the seat having downwardly extending projections with aligned apertures; a base having a front end and a back end and side edges therebetween, the base having upwardly extending projections with aligned apertures; a cylindrical pivot shaft located within the apertures of the seat and base to allow the pivoting of the seat with respect to the base; a latch rod pivotally secured to the base with a latch mounted adjacent to each end thereof, each latch having a plurality of recesses adapted to receive pins of the seat to thereby secure the seat in any one of a plurality of angular positions; and spring means to hold the recesses in contact with the pins.

The invention may also be incorporated into an improved restraining system for a child comprising in combination a child seat having downwardly extending projections with aligned apertures; a base having upwardly extending projections with aligned apertures; a cylindrical pivot shaft located within the apertures of the seat and base to allow the pivoting of the seat with respect to the base; latch means pivotally secured to the base with a plurality of notches adapted to selectively receive pin means of the seat to thereby secure the seat in any one of a plurality of angular positions; and resilient means to hold the recesses in contact with the pins.

The pin means includes two horizontal pins fixedly positioned on a forward, lower extent of the seat. The latch means includes two laterally spaced latches pivotably secured to a latch rod for rotation therewith in a forward portion of the base. The notches are spaced one above the other and of a size to encompass more than 180 degrees of the pins. The notches include surfaces extending over the top of the pins.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
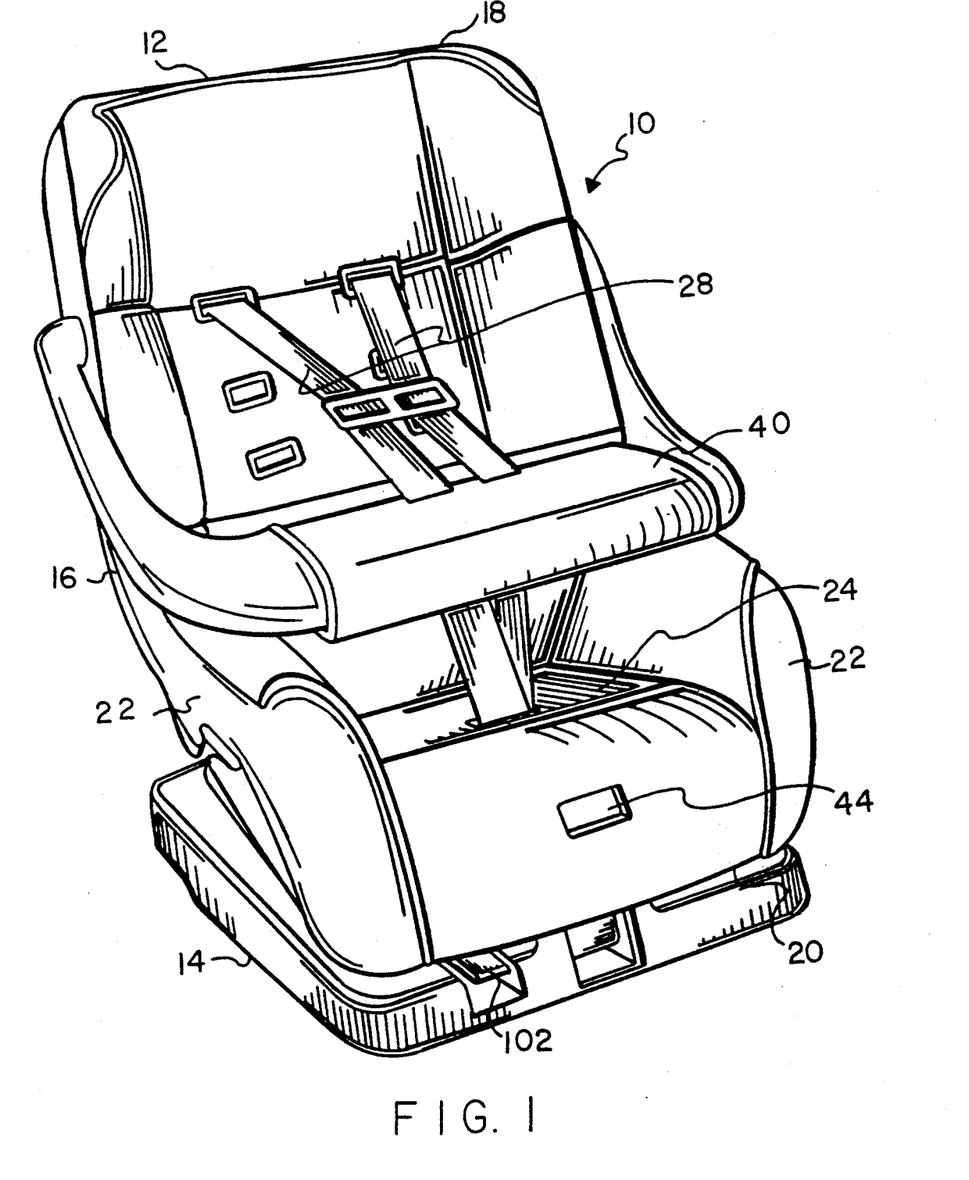
FIG. 1 is a perspective illustration of a child seat operatively coupled to a base in accordance with the principles of the present invention.

From an overview standpoint, the child restraint system 10 can most readily be seen by reference to the perspective showing of FIG. 1, particularly when viewed in association with the more detailed additional Figures. The system 10 of the present invention is made up of two major components, the child seat 12 and the base 14. The child seat 12 is of conventional construction. It includes a main body portion or shell 16 extending from a head end 18 to a foot end 20 and is constructed of a size and shape and contoured along its length to receive and support a child. Side portions 22 extend upwardly from both side edges of the central extent to restrain the child against lateral movement. A soft pad 24 is utilized upon which the child may sit for greater comfort. Elongated apertures 26 extend through the shell 16 and pad 28 for the passage of a plurality of straps or belts 28 with a latch plate 30 for restraining the child in the seat in the normal manner.

The seat 12 is preferably fabricated of a rigid impact resistant, high polymer plastic such as polyethylene, polyvinyl chloride, or the like, similar to the material used for the base 14. The base and seat are preferably color coordinated for aesthetic purposes.

The lower face of the seat 12 is provided with strengthening ribs and downwardly extending lower projections 34 adjacent its sides. The projections include apertures 36 therethrough for effecting its coupling with the base 14 in a manner as will be more fully described hereinafter.

Figure 2:
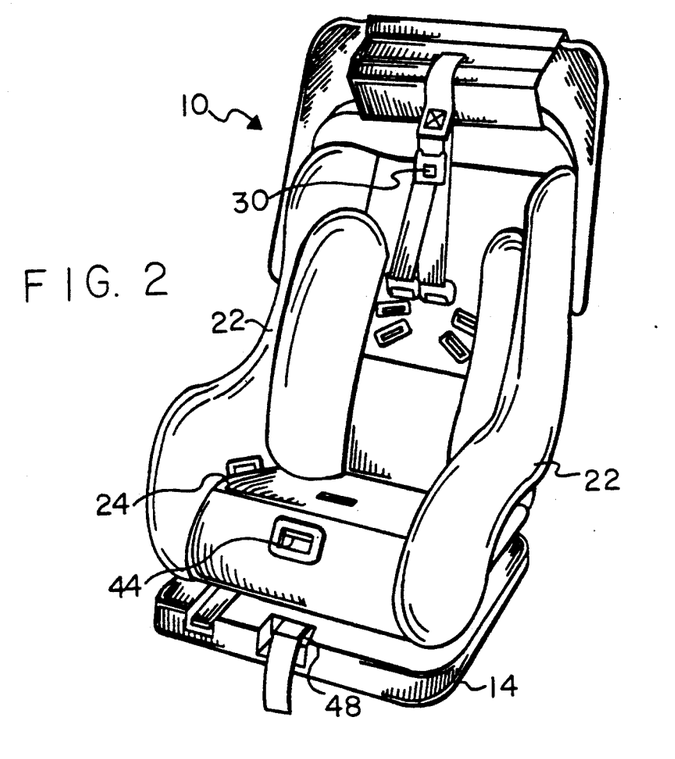
FIG. 2 is a perspective illustration similar to FIG. 1 but showing the swing shield in the raised position.
Figure 3:
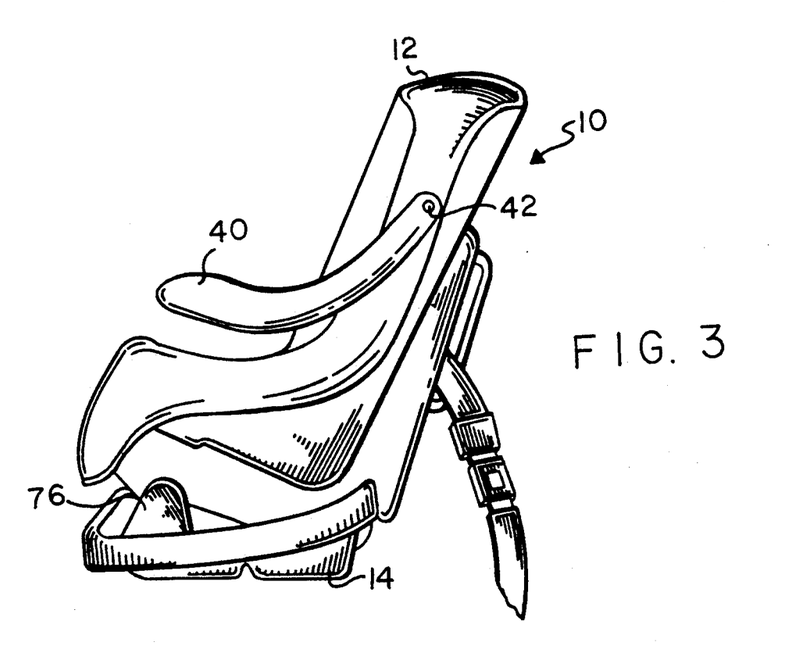
FIG. 3 is a side elevational view of the seat and base of FIG. 1.
Figure 4:
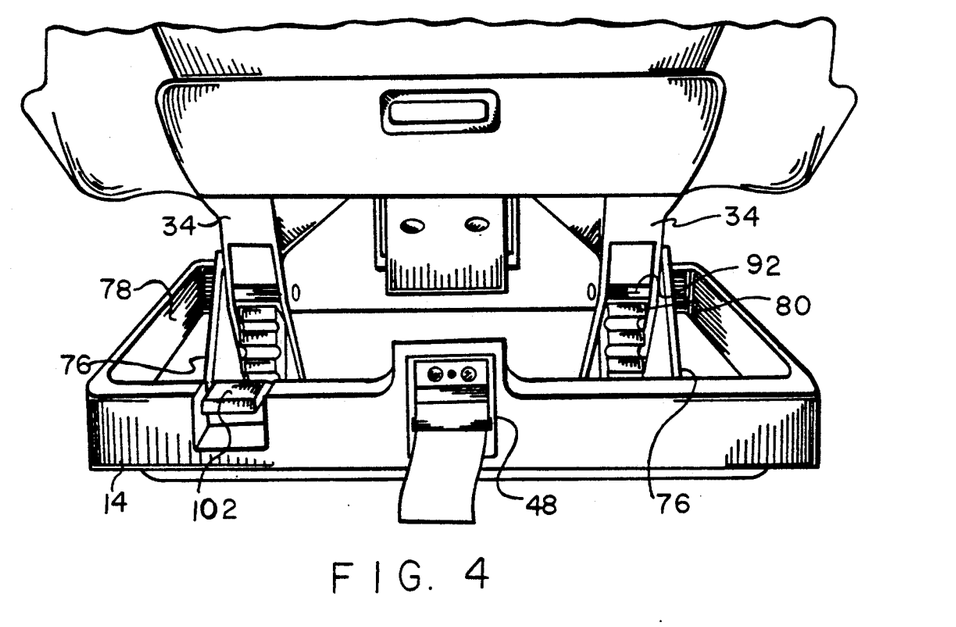
FIG. 4 is an enlarged perspective view of the lower front portion of the seat and base.
Figure 5:
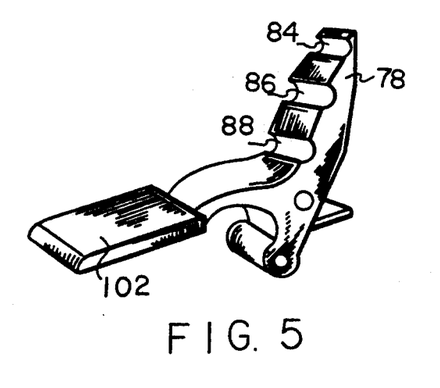
FIGS. 5 and 6 are perspective and sectional views of the latch mechanism of base for allowing the seat to be supported at any one of a plurality of angles.
Figure 6:
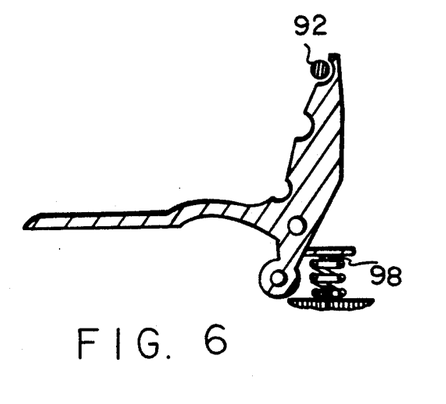
Figure 7:
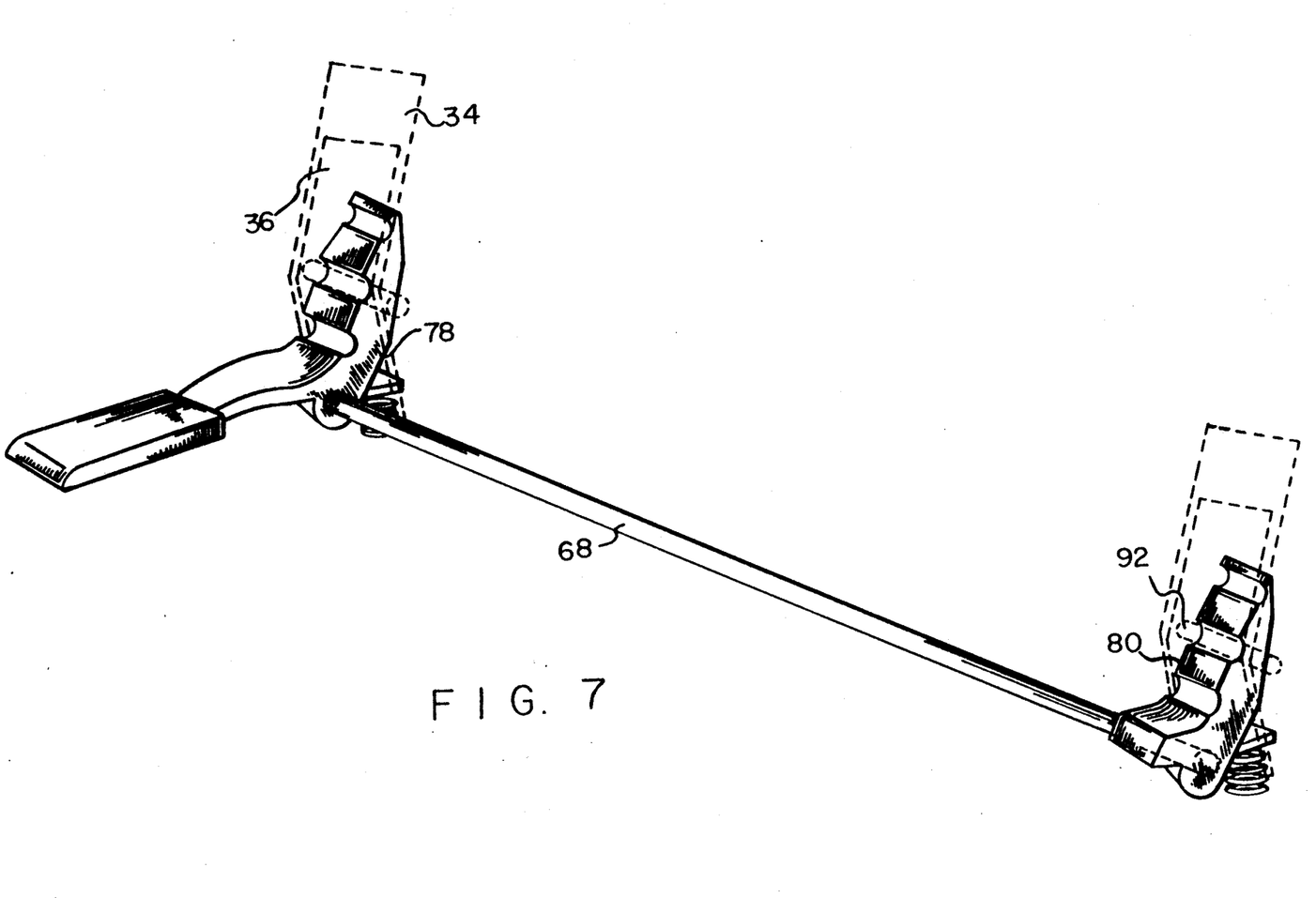
FIG. 7 is a perspective view of the pair of latches and associated pivot bar coupling the associated portions of the seat which are shown in phantom lines.

The seat is provided with a swing shield 40 pivotable in the seat 12. The shield is coupled by hinge pins 42 extending through the sides of the seat at an upper extent of its length. When lowered, the swing shield secures the child in the seat through the belt system. Note FIG. 1. When raised, the child may enter or leave the seat. Note FIG. 2. A release button 44 on the front of the seat allows release of the belt latch plate 30 while a securement assembly 48 allows adjustment of the belt tension for the particular child in the seat.

The other major component of the system is the base 14 The base includes a central extent 64 for receiving the central extent 26 of the seat 12. Molded with the central extent are upstanding side walls 66. Extending laterally on the base from side to side and extending upwardly therefrom is an upstanding central projection 52. The ends of the projection 52 have downwardly extending semicircular recesses for receiving the ends of a cylindrical pivot shaft 54. The central extent of the projection is also provided with a semicircular recess for receiving the central portion of the pivot shaft 54. Molded rigid straps 56 extend upwardly from the central extent of the projection 52 for holding the pivot shaft 54 in place on the base during operation and use. Between the central and side extents of the projection are enlarged slots 58 for receiving the projections 34 of the seat. In association with the seat projections 34 of the seat 12, the free ends 62 of a back-supporting U-shaped tube 64 are supported for rotation with the seat projections 34 about the cylindrical pivot shaft 54. The pivot shaft 54 thus is secured at its center to the central projection of the base Outwardly thereof the central projection 52 has slots which receive the seat projections 34 and support tube ends 62. The ends of the pivot shaft 54 are received in the end recesses of the projection 52.

In addition, a latch rod 68 is supported in the base 14 adjacent the forward extent Each end of the latch rod 68 is received within an upwardly extending forward recess Its position is maintained by washers 72 with screws 74. The screws 74 are mounted into the base 14 above the latch rod 68 with the forward extent of the washers 72 entrapping the latch rod 68 on the base 14. Flanges 76 extend upwardly from the base 14 to ensure reciprocal movement of the seat 14 in a vertical plane.

Secured to the opposite ends of the latch rod 68 are latches normally urged counterclockwise in the Figures to move notches 84, 86, 88 into engagement with the latch pins 92 at the lower forward extent of the seat 12. Springs 96 are positioned in extensions 98 between the base 14 and latches 78 and 80 to effect and maintain the locking relationship between seat and base.

One of the latches 78 is provided with a forwardly extending lever bar 102 located at the forward lower end of the base 14. Lifting of the lever bar 102 upwardly move the latches and notches of the vertical portion of the latches 78 and 80 out of contact with the latch pins 92 to thereby allow pivoting of the seat 12 on the pivot shaft 54. Both latches 78 and 80 are secured to the latch rod 68 for concurrent rotation. In this manner with the notches disengaged from the pins, the seat 12 may pivot freely about the pivot shaft 54 to a preselected angular orientation with respect to the base 14. Upon release of the lever bar 102 the springs 96 will urge the latches and notches into engagement with the pins 92 in any of three angular orientations corresponding to the three notches of the latches 78 and 80. The seat 12 may thus be varied to a forward, central and rearward angle of orientation.

Figure 8:
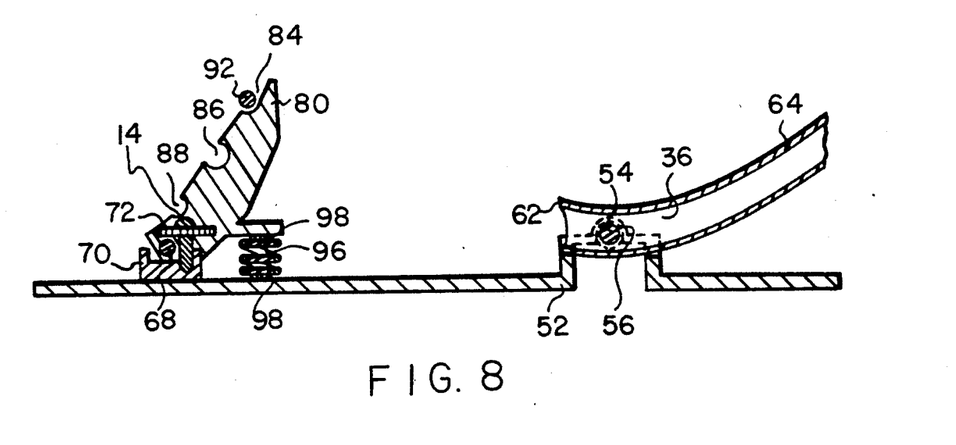
FIGS. 8 and 9 are sectional and front elevational views of the coupling mechanisms between the seat and base.
Figure 9:
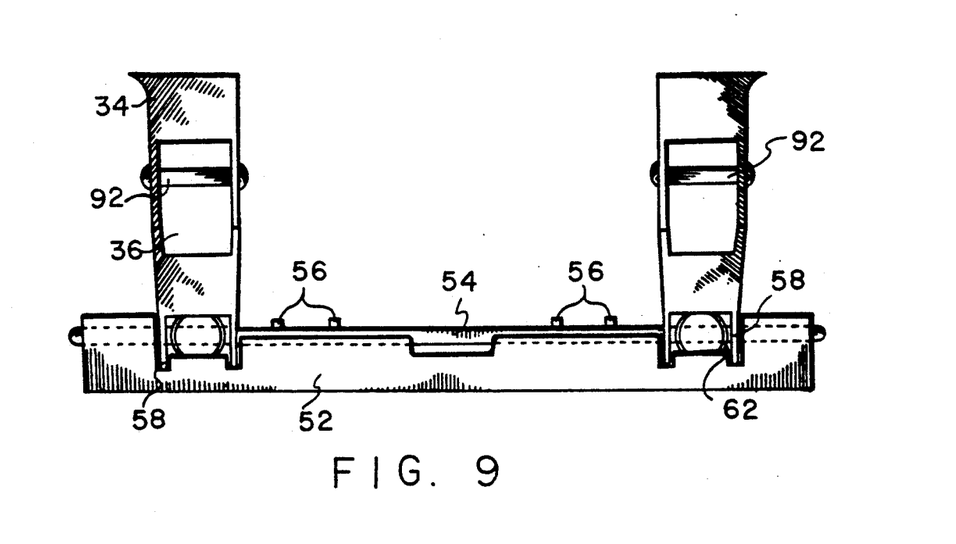
Figure 10:
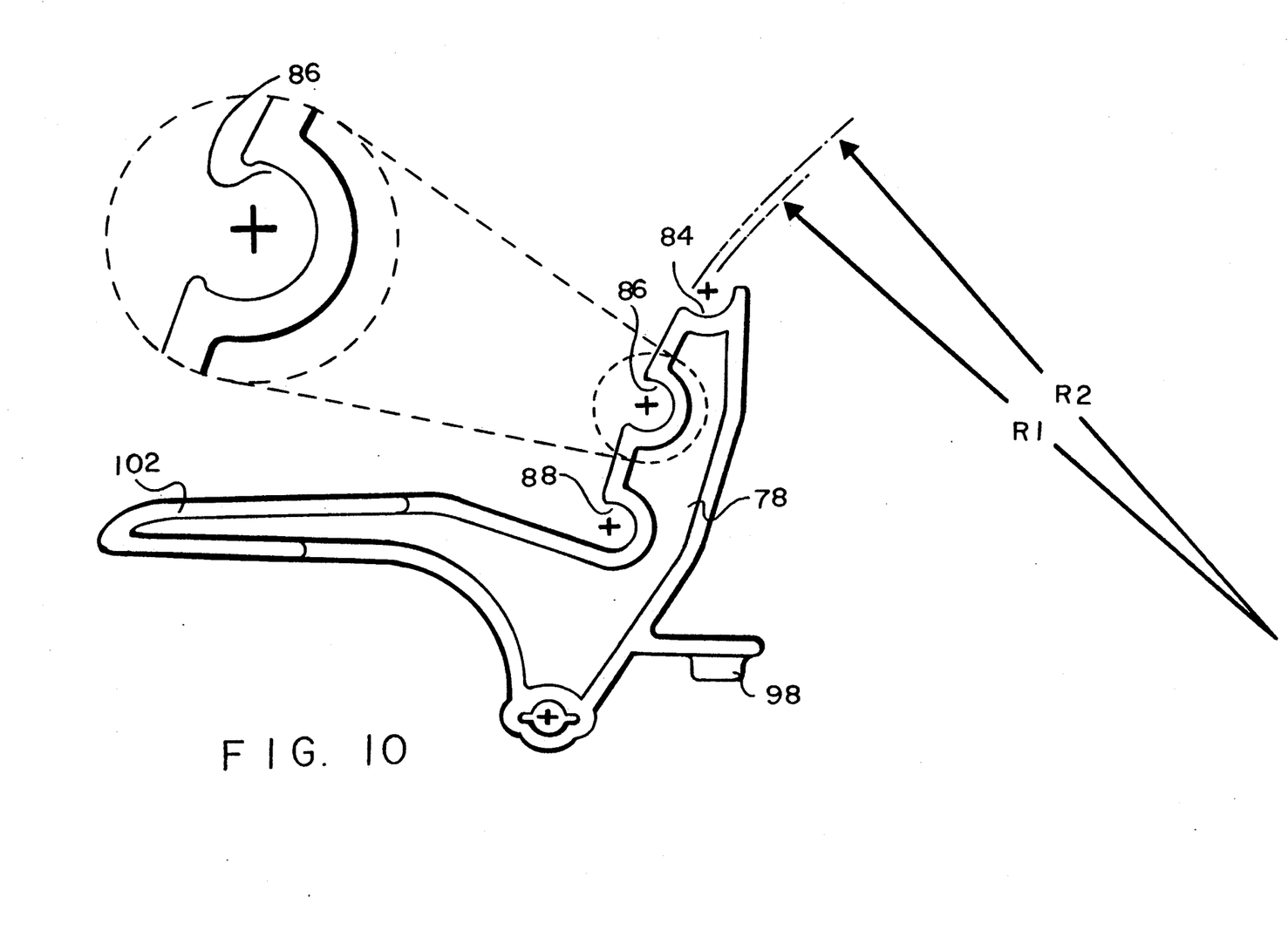
FIG. 10 is a schematic showing of the relationship between the cylindrical pivot shaft, latch rod and latch pins.

Securement of the latch and pins is best understood by reference to FIG. 10. The front radius of curvature R-2 is formed from the seat pivot shaft. R-1 is the radius from the seat pivot shaft axis to the various centerlines of radii which form the notches into which the latch pins 92 engage to fixedly position the seat. This relationship keeps the radius of the face of the latches at a constant position with respect to the pins with which the latches cooperate. The actual latching feature, the inner curved faces of the notches, is formed such that its axis falls inside the radius R-2 which forms the face of the part. This gives more than 180 degrees of capture on the pins while securing the position of the seat. Otherwise the pins might cam out under the loading of a crash and disengage from the retaining radius of the notches. Under load forces of an accident, the pins are more tightly held in position than at rest. This keeps the seat from jumping position in a crash and failing to meet the industry standards for safety. In FIG. 8 the spring which causes the latch to engage the rivet does not overcome the forces acting on the system resulting from a crash. It does catch the system at rest and positions the parts such that if a crash occurs, the self locking design will be ready to receive the load.

Note again FIG. 10 showing the relationship between the pin and notches The two lower notches encompass the pins by greater than 180 degrees to enhance securement therebetween. Movement of the seat out of the upper notch is enhanced by the back of the seat bearing against the back of the base. Also of importance in enhancing between pin and notches is the fact that the upper edge of the two lower notches extends beyond the tangential centerline of the pin and notches to abate inadvertent rocking of the seat with respect to the base. This over-center relationship minimizes movement of the latches with respect to the pins and, hence, movement of the seat with respect to the base in the event of forces caused by an accident resulting in increased overall safety of the system.

Also located on the pivot rod for rotation thereabout with the remainder of the seat portion is a support tube 64 having a generally inverted U-shaped configuration. The support tube has generally vertical legs secured at their lower ends 12 to the pivot shaft for rotation thereabout The vertical legs extend upwardly through recessed areas of the seat portion. The vertical legs are integrally formed with, or otherwise coupled at their upper ends by, a generally horizontal leg extending across the majority of the width of the seat portion. The horizontal leg and the upper ends of the vertical legs are fixedly positioned but spaced from the rear face of the seat portion. This allows for a space between the seat portion and U-shaped tube through which the seat belt of the car may pass.

The central part of the horizontal leg is securely coupled to the upper extent of the seat portion through a bracket assembly, not shown. Since this general zone of the child safety seat will receive the greatest forces in the event of a sudden stop or turn, collision or other emergency, the seat portion is reinforced with a horizontal tube parallel with the horizontal leg of the U-shaped tube. The tube of the seat portion is located interiorly of the frame of the seat portion above its midpoint so that the seat portion, rod and horizontal leg are adjacent to each other on opposite sides of the seat portion frame at the upper convex projection for maximum strength. Mating brackets secure the tube and horizontal leg with respect to each other and the seat portion frame through permanent rivets extending through the brackets and the frame.

In operation and use, the horizontal lap belt of a three-point seat belt extends in contact with the vertical legs between the vertical legs and the rear face of the seat portion. The transverse shoulder belt is positioned in contact with a central extent of the horizontal leg between the horizontal leg and the rear face of the seat portion. In this manner, with the U-shaped tube securely coupled to the seat portion, a restraining force resisting motion of the child safety seat will be provided at two points below the midpoint of the safety seat and its seat portion. A third or single restraining force will also be provided above the midpoint of the safety seat and its seat portion. Such an arrangement of three triangularly arranged spaced contact points between the seat belt of the car and the child safety seat will provide for more protection against tipping than was ever previously possible.

Figure 11:
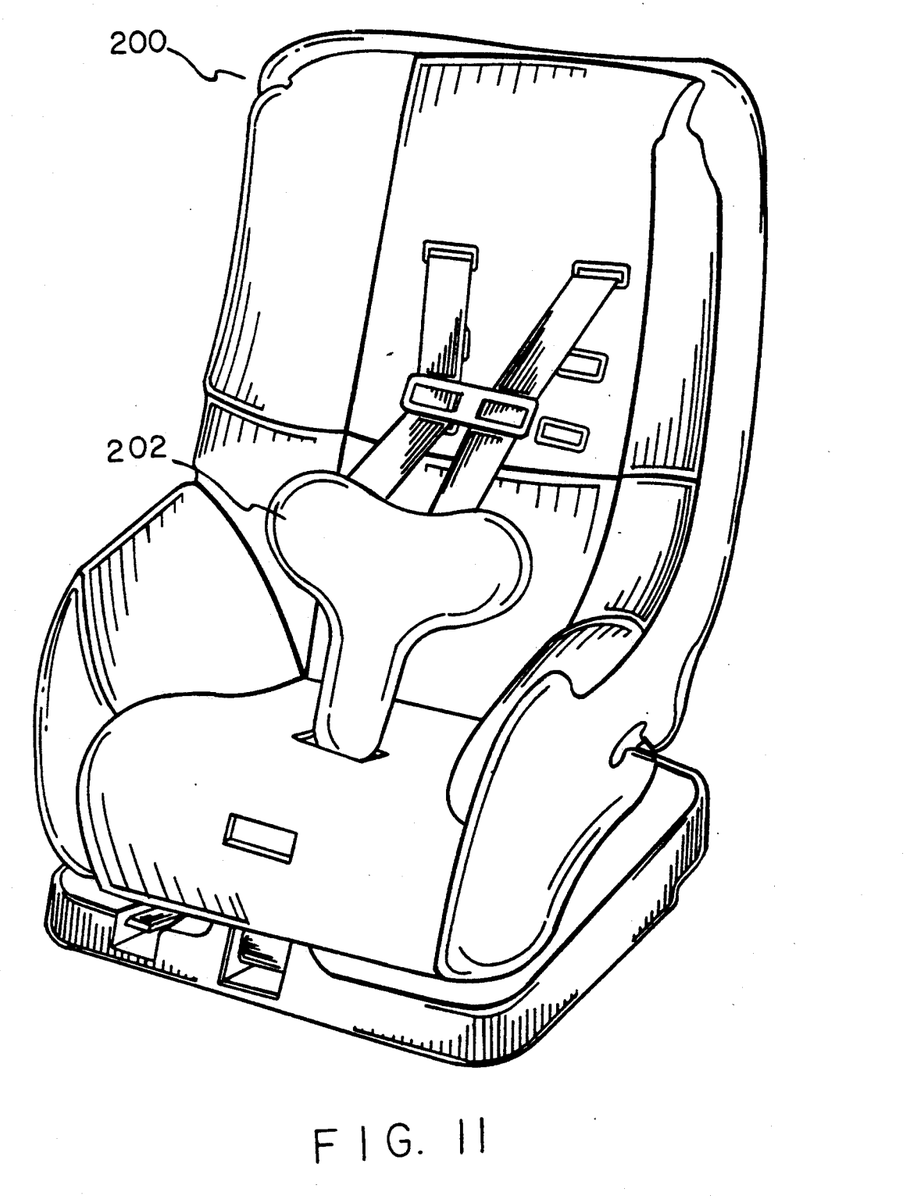
FIG. 11 is a perspective showing of an alternate embodiment of the invention.

An alternate embodiment of the invention is the child restraint system 200 shown in FIG. 11. In that embodiment, the swing shield 40 is replaced by a T-shield 202. The strap ends are coupled to the T-shield while the T-shield has a rigid tongue at its lower end for coupling with the seat to provide restraint for the child in the seat. In yet a further alternate embodiment of the invention, securement of the chid to the system may be made through a five point harness arrangement. Such harness systems are conventional and known in the art.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of structures and the combination and arrangement of parts may be resorted to without departing from the spirit and scope of the invention.

Now that the invention has been described,
What is claimed is:

1. A restraining system for a child comprising in combination:
   a child seat having a foot end and a head end and side edges therebetween, the seat having downwardly extending projections with aligned apertures;
   a base having a front end and a back end and side edges therebetween, the base having upwardly extending projections with aligned apertures;
   a cylindrical pivot shaft located within the apertures of the beat and base to allow the pivoting of the seat with respect to the base;
   a pin located at each edge of the seat adjacent to the front thereof;
   a latch rod pivotally secured across the front of the base with a latch mounted adjacent to each end thereof, each latch having a plurality of forwardly facing recesses located on above the other in a convex curved orientation and adapted to receive a pin of the seat to thereby secure the seat in any one of a plurality of angular positions; and
   spring means coupled between the base and one of the latches to hold the recesses in contact with the pins.

2. A restraining system for a child comprising in combination:
   a child seat having downwardly extending projections with aligned apertures;
   a base having upwardly extending projections with aligned apertures;
   a cylindrical pivot shaft located within the apertures of the seat and base to allow the pivoting of the seat with respect to the base;
   pin means located at each edge of the seat at the front thereof;
   latch means pivotally secured to the front of the base with a plurality of notches located one above the other in a convex curved orientation and adapted to selectively receive pin means of the seat to thereby secure the seat in any one of a plurality of angular positions; and
   resilient means between the latch means and base to hold the recesses in contact with the pin means.

3. The system as set forth in claim 2 wherein the pin means includes two horizontal pins fixedly positioned on a forward, lower extent of the seat.

4. The system as set forth in claim 3 wherein the latch means includes two laterally spaced latches pivotably secured to a latch rod for rotation therewith in a forward portion of the base.

5. The system as set forth in claim 4 wherein the notches are spaced one above the other and of a size to encompass more than 180 degrees of the pins.

6. The system as set forth in claim 4 wherein the notches include surfaces extending over the top of the pins.

* * * * *